United States Patent
Ohlsson et al.

(10) Patent No.: US 9,126,269 B2
(45) Date of Patent: Sep. 8, 2015

(54) MULTILAYER POLYOLEFIN BLOWN FILM

(75) Inventors: Stefan B. Ohlsson, Keerbergen (BE);
Dirk J. Permentier, Meerbeke (BE);
Michael J. Vinck, Lebbeke (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 375 days.

(21) Appl. No.: 13/228,570

(22) Filed: Sep. 9, 2011

(65) Prior Publication Data

US 2012/0100356 A1    Apr. 26, 2012

Related U.S. Application Data

(60) Provisional application No. 61/406,820, filed on Oct. 26, 2010.

(51) Int. Cl.
    B32B 27/20    (2006.01)
    B23B 27/20    (2006.01)
    B32B 27/32    (2006.01)

(52) U.S. Cl.
    CPC ............... B23B 27/20 (2013.01); B32B 27/32 (2013.01); B32B 27/327 (2013.01); B32B 2439/00 (2013.01); Y10T 428/2495 (2015.01); Y10T 428/24992 (2013.01)

(58) Field of Classification Search
    CPC ...... B32B 27/20; B32B 27/327; B32B 27/32; Y10T 428/24992; Y10T 428/2495
    USPC ................... 428/212, 213, 218, 220
    See application file for complete search history.

(56) References Cited

U.S. PATENT DOCUMENTS

2005/0064218 A1 *   3/2005   Davis et al. ............ 428/516

FOREIGN PATENT DOCUMENTS

WO    WO 2007/130277    * 11/2007 .............. C08L 23/08

* cited by examiner

*Primary Examiner* — Aaron Austin
*Assistant Examiner* — Lawrence Ferguson
(74) *Attorney, Agent, or Firm* — Leandro Arechederra, III

(57) ABSTRACT

A multilayer blown film with improved strength or toughness comprising a layer comprising a metallocene polyethylene (mPE) having a high melt index ratio (MIR), a layer comprising an mPE having a low MIR, and a layer comprising a HDPE, and/or LDPE. Other embodiments have skin layers and a plurality of sublayers. At least one sublayer includes an mPE, and at least one additional sublayer includes HDPE and/or LDPE. The mPE has a density from about 0.910 to about 0.945 g/cm$^3$, MI from about 0.1 to about 15, and melt index ratio (MIR) from about 15 to 25 (low-MIR mPE) and/or from greater than 25 to about 80 (high-MIR mPE). A process is related to supplying respective melt streams for coextrusion at a multilayer die to form a blown film having the inner and outer skin layers and a plurality of sublayers, wherein the skin layers and at least one of the sublayers comprise mPE and at least one of the sublayers comprise HDPE, LDPE or both. Draw-down, blow-up ratios and freeze-line distance from the die are controlled to facilitate a high production rate.

18 Claims, 2 Drawing Sheets

MULTILAYER POLYOLEFIN BLOWN FILM

PRIORITY CLAIM TO RELATED APPLICATIONS

This application claims priority to U.S. Provisional Application Ser. No. 61/406,820 filed Oct. 26, 2010, the disclosure of which is fully incorporated herein by reference.

BACKGROUND OF THE INVENTION

The present invention relates generally to multilayer blown films made from polyolefins and methods to make the films.

Since it was first invented, 3-layer blown film coextrusion has improved the mechanical properties of films tremendously relative to films made with the same composition in a monolayer construction. More recently, the limit of maximum achievable mechanical properties using 3-layer films appears to have been reached in many specific applications using the latest polyolefin resins.

Five-layer blown films have been in existence for many years, but these were typically used to create films which contained resins which were non-polyolefinic with the intention of creating barrier properties. The dies used for this technology have very thin core layers because the resins typically used for the barrier layer are relatively expensive and their use was desirably minimized by employing a thin layer. A layer distribution which emphasized thick skin layers and thin sub-skin and core layers was typical for these types of dies. Polyolefin-only films made on such equipment did not show major improvements in properties over equivalent composition films made in conventional 3-layer equipment.

There is a need in the art for films that improve on the mechanical property limits achievable with 3-layer blown polyolefin films. There is also a need in the art to improve the mechanical properties of blown films having more than three layers.

SUMMARY OF THE INVENTION

In accordance with an embodiment of the invention, it has been found that polyolefin blown films containing more than three layers can obtain significant improvements in mechanical properties relative to the best three layer blown films, even though both films comprise the same or similar resins.

In accordance with an embodiment, a multilayer blown film comprises a first and second metallocene polyethylene (mPE) layers and a third layer comprising high density polyethylene (HDPE), low density polyethylene (LDPE) or a combination thereof. As used herein, an mPE is a single-site catalyzed copolymer derived from ethylene and one or more $C_3$ to $C_{20}$ α-olefin comonomers, wherein the copolymer has a density from about 0.910 to about 0.945 g/cm$^3$, a melt index (MI), $I_{2.16}$, from about 0.1 to about 15, a molecular weight distribution (MWD) from about 2.5 to about 5.5, and melt index ratio (MIR), $I_{21.6}/I_{2.16}$, from about 15 up to 25 (low-MIR mPE) or from greater than 25 up to about 80 (high-MIR mPE). The first layer mPE comprises a low-MIR mPE and the second layer mPE comprises a high-MIR mPE. The first, second and third layers may each optionally comprise other polymers, provided that the compositions are different, e.g., where the first and second layers both comprise low-MIR and high-MIR mPE, a blend ratio of the low-MIR to high-MIR mPE in the first layer is different from a blend ratio of the low-MIR to high-MIR mPE in the second layer, or where the third layer further comprises an mPE and one or both of the first and second layers further comprise HDPE, LDPE or a combination thereof, a proportion of the HDPE, LDPE or combination thereof in the third layer by weight of the total polymer in the third layer is different from the proportions of HDPE, LDPE or combination thereof in the first and second layers.

In another embodiment, multilayer blown film comprises skin layers and at least one sublayer comprising a metallocene polyethylene (mPE), and at least one sublayer comprising high density polyethylene (HDPE), low density polyethylene (LDPE) or a combination thereof. The mPE, which can be the same or different in the skin layers and/or the at least one sublayer, is made using a single-site catalyst and comprises a copolymer derived from ethylene and one or more $C_3$ to $C_{20}$ α-olefin comonomers, wherein the copolymer has a density from about 0.910 to about 0.945 g/cm$^3$, a molecular weight distribution (MWD) from about 2.5 to about 5.5 and a melt index (MI), $I_{2.16}$, from about 0.3 to about 15. The mPE in one embodiment has a melt index ratio (MIR), $I_{21.6}/I_{2.16}$, from about 15 up to 25, preferably from about 15 to about 20 (low-MIR mPE), or in another embodiment from greater than 25 up to about 80, preferably from about 28 to about 80 (high-MIR mPE).

In another embodiment, a method supplies respective melt streams to a multilayer blown film extruder die and coextrudes the melt streams to form the blown film comprising the skin layers and sublayers described herein. The draw-down ratio (DDR) and blow up ratio (BUR) are controlled, and the film is cooled adjacent the bubble to maintain a predetermined freeze-line distance from the die.

DETAILED DESCRIPTION

Figure 1:
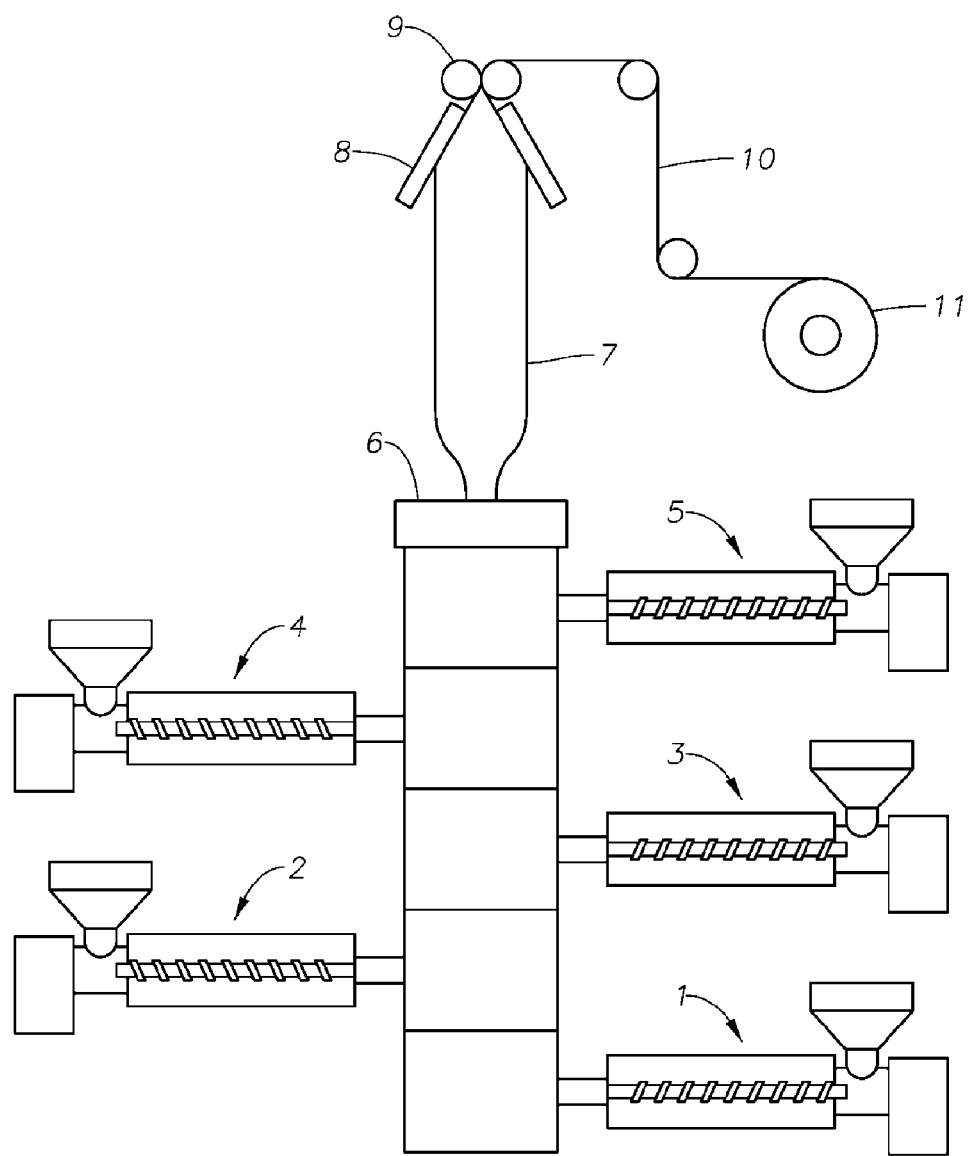
FIG. 1 is a schematic view of an extruder line for making a multilayer blown film according to an embodiment.

In one embodiment, the invention is a multilayer blown film with improved strength or toughness comprising a layer comprising a metallocene polyethylene (mPE) having a high melt index ratio (MIR), a layer comprising a mPE having a low MIR, and a layer comprising a HDPE, and/or LDPE.

In accordance with an embodiment of the invention a multilayer blown film comprises at least four distinct layers including a pair of skin layers on opposite surfaces of a sub-laminate assembly of at least two sublayers. For example, the sublayers can comprise a pair of intermediate sublayers on either side of a core sublayer. The skin layers and at least one sublayer comprise a metallocene polyethylene (mPE), hereinafter referred to as the "mPE sublayer(s)," and at least one of the other sublayer(s) comprise high density polyethylene (HDPE), low density polyethylene (LDPE) or a combination thereof, hereinafter referred to as the "HDPE/LDPE sublayer(s)."

The mPE can be the same or different in the skin layers and/or the at least one sublayer. In an embodiment, the skin layers independently comprise low-melt index ratio (MIR), $I_{21.6}/I_{2.16}$, from about 15 up to 25, high-MIR mPE (MIR greater than 25 up to about 80), or a combination thereof. In another embodiment, the mPE used in the sublayer(s) comprises low-MIR mPE, high-MIR mPE, or a combination thereof. Likewise where a plurality of the HDPE/LDPE sublayers are present, the composition can be the same or different in each of the sublayers.

In one embodiment, the at least one mPE sublayer comprises at least one pair of intermediate layers on opposite sides of a core sublayer comprising the HDPE/LDPE sublayer. As used herein a "core sublayer" is a dissimilar sublayer sandwiched between a pair of sublayers of the same or similar composition. For example, where the skin layers are designated S, the mPE sublayers as A and the HDPE/LDPE sublayers as B, the film can have the structure S/A/B/A/S, S/A/B/A/B/A/S, and so on. In one embodiment, where the mPE sublayers are spaced apart by the HDPE/LDPE core sublayer, the processability of the film is facilitated, e.g., allowing a higher throughput, lower energy or the like, and the mechanical properties are about the same or improved, relative to a similar three-layer film without the mPE sublayers.

In one embodiment, the at least one HDPE/LDPE sublayer comprises at least one pair of intermediate layers on opposite sides of a core sublayer comprising the mPE sublayer, e.g., S/B/A/B/S, S/A/B/A/S, S/B/A/B/A/B/S, S/A/B/A/B/A/S or the like. In one embodiment, where the HDPE/LDPE sublayers are spaced apart by the mPE core sublayer, the stiffness of the film is increased, relative to a similar film without the HDPE/LDPE sandwiching structure.

In an embodiment, where both intermediate and core sublayers are present, the intermediate sublayers are preferably from about 1 to about 2 times as thick as one of the skin layers, and the core sublayer(s) is from about 1 to about 6 times as thick as one of the intermediate layers. In an embodiment, the intermediate and core sublayers are at least as thick as or thicker than the skin layers. For example, in a five-layer film the relative thickness ratios (skin layer/intermediate sublayer/core sublayer/intermediate sublayer/skin layer) can be 1/1/1/1/1, 1/1/4/1/1, 1/1/6/1/1, 1/2/2/2/1, 1/2/4/2/1, or the like. In an embodiment, the skin layers can have the same or different thickness from about 2 µm to about 40 µm (about 0.08 to about 1.6 mils). In an embodiment, the overall thickness of the blown film can range from about 20 µm to about 400 µm (about 0.8 to about 16 mils).

In one particular embodiment (useful for increasing production rate in one embodiment), the skin layers independently comprise the low-MIR mPE, and the sublayers comprise intermediate sublayers of the high-MIR mPE, and a core sublayer of LDPE. The skin layer in one embodiment further comprise up to 95 percent by weight of another polymer selected from the group consisting of: LDPE, differentiated polyethylene (DPE) and combinations thereof. In one embodiment, the multilayer film comprises, relative to a 3-layer reference film, (A) about the same or higher machine direction (MD) tensile at break, MD 1% secant modulus and puncture resistance (maximum force), and (B) substantially higher MD elongation at break, transverse direction (TD) tensile at break and MD Elmendorf tear strength. The reference film in this embodiment has a core having the same composition and thickness as the multilayer film core, and skin layers having the same composition as the multilayer film skin layers and the same thickness as the combined thickness of one of the multilayer film skin layers and one of the intermediate layers. As used herein, a property of the multilayer film is about the same as the same property of the reference film if the multilayer film property is within about fifteen percent of the reference film property; and substantially higher if the multilayer film property is more than about twenty percent of the reference film property, in the same units.

In another particular embodiment (useful for collation shrink applications in one embodiment), the multilayer blown film independently comprises low-MIR mPE skin layers, high-MIR mPE intermediate sublayers and an HDPE/LDPE core sublayer. In an embodiment, the skin layers comprise up to 80 percent by weight of another polymer selected from the group consisting of HDPE, LDPE and combinations thereof, and the core sublayer comprises HDPE and LDPE at a ratio from 1:10 to 10:1 by weight. In an embodiment, the multilayer film comprises, relative to a 3-layer reference film, (A) about the same or higher MD tensile at break and MD elongation at break and puncture resistance (maximum force), and (B) substantially higher MD Retramat shrink force and MD 1% secant modulus, wherein the reference film comprises a core and skin layers having the same composition as the multilayer film core and skin layers, respectively, wherein the reference film skin layers are twice as thick as the multilayer film skin layers and wherein the reference film core sublayer is the same thickness as the total thickness of the multilayer film core sublayer plus one of the intermediate layers.

In another particular embodiment (useful for making heavy duty bags in one embodiment), the multilayer blown film independently comprises mPE skin layers selected from low-MIR mPE, high-MIR mPE and combinations thereof, HDPE intermediate sublayers and an mPE core sublayer selected from low-MIR mPE, high-MIR mPE and combinations thereof. In another embodiment, the multilayer blown film independently comprises high-MIR mPE skin layers, HDPE intermediate sublayers and a low-MIR mPE core sublayer. In an embodiment, the multilayer film comprises, relative to a 3-layer reference film, (A) about the same or higher MD 1% secant modulus and Dart impact strength, and (B) higher MD tensile strength at break, MD bending stiffness, puncture force and creep at 50° C. and 1 kg, wherein the reference film comprises the same skin layer composition as the multilayer film, wherein the reference film core sublayer comprises a 60-40 blend by weight of the HDPE in the intermediate sublayers and the mPE in the multilayer film core sublayer, wherein the overall thickness of the reference film is the same as the multilayer film, and wherein the reference film skin layers are each one-third the thickness of the reference film core sublayer.

In another particular embodiment (useful for laminating film applications in one embodiment), the multilayer blown film independently comprises mPE skin layers comprising the low-MIR mPE and the high-MIR mPE at a ratio from 1:10 to 10:1 by weight, HDPE intermediate sublayers and a high-MIR mPE core sublayer. In another embodiment, the HDPE intermediate sublayers further comprise up to 90 percent by weight of a propylene-based polymer. In an embodiment, the multilayer film comprises, relative to a 3-layer reference film, (A) about the same or higher MD tensile strength at break and (B) substantially higher TD 1% secant modulus and MD 1% secant modulus, wherein the reference film has skin layers comprising an 85-15 blend by weight of the same low-MIR mPE and the same high-MIR mPE as the multilayer film skin layers, and has a core sublayer of the same high-MIR mPE as the multilayer film core sublayer, wherein each of the skin layers in the reference film are one-half the thickness of the reference film core sublayer, and wherein the overall thickness of the reference film is the same as the multilayer film.

In an embodiment of the process of the present invention, respective melt streams are supplied to a multilayer blown film extruder die, and coextruded to form a blown film comprising inner and outer skin layers and a plurality of sublayers. The skin layers in an embodiment comprise an mPE selected from low-MIR mPE, high-MIR mPE or a combination thereof, wherein at least one of the sublayers comprises mPE, and wherein at least one of the sublayers comprises HDPE, LDPE or a combination thereof. The draw-down ratio (DDR) and blow-up ratio (BUR) at the bubble are controlled at a DDR from about 1 to about 500 and a BUR from about 1.2 to about 4.5, and the film is cooled adjacent the bubble to maintain a freeze-line distance from the die between about 1.5 times the die diameter and about 5 times the die diameter.

In another process embodiment, the sublayer mPE comprises low-MIR mPE, high-MIR mPE, or a combination thereof, and in a further embodiment, the at least one mPE sublayer comprises a pair of intermediate sublayers on opposite sides of a core sublayer comprising the at least one sublayer comprising the HDPE, LDPE or combination thereof. In an embodiment, the intermediate layers are from about 1 to about 2 times as thick as one of the skin layers and wherein the core sublayer is from about 1 to about 6 times as thick as one of the intermediate layers. In one particular embodiment, the skin layers independently comprise the low-MIR mPE; the sublayer mPE comprises high-MIR mPE and the at least one mPE sublayer comprises a pair of intermediate layers on opposite sides of a core sublayer comprising the at least one sublayer comprising HDPE, LDPE or a combination thereof; and the core sublayer comprises LDPE.

The multilayer blown films in an embodiment are made in a high-stalk extrusion process. With reference to FIG. 1, an extruder line schematic is shown for making a 5-layer embodiment of the multilayer blown film and carrying out the process of the invention according to one non-limiting embodiment. Extruders 1, 2, 3, 4, 5 feed melt streams to the stack die 6, which forms an inflated bubble 7 extending to the guide tent 8 where the tubular, blown film is taken up at the nip rolls 9, from which the webbing 10 is wound onto windup roll 11. Typical melt temperatures are from about 175° C. to about 225° C.

In this process, the melt streams are fed through a gap (typically 30-50 μm) in an annular die 6 and forms a tube of molten polymer which is moved vertically upward. The initial diameter of the molten tube is approximately the same as that of the annular die 6. Pressurized air is fed to the interior of the tube to maintain a constant air volume inside the Bubble 7. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 13 to 51 μm (0.5 to 2 mils) and by a development of biaxial orientation in the film. The expanded tube is rapidly cooled (which induces crystallization of the polymer), collapsed between a pair of nip rolls 9 and wound onto a film roll 11. If desired the film can be axially slit and unfolded to form a flat film, or otherwise subjected to a desired auxiliary process, such as treating, sealing, or printing. In an embodiment, the skin layer resins are supplied via extruders 1, 5, the core sublayer resins via extruder 3, and the intermediate sublayer resins via extruders 2, 4.

Two factors are useful to determine the suitability of a particular polyethylene resin or blend for high stalk extrusion: the maximum attainable rate of film manufacture and mechanical properties of the formed film. Adequate processing stability for thin gauge manufacture on modern multilayer extrusion equipment is desired at high line speeds (>61 m/min (200 ft/min)) and throughput rates from about 0.9 to about 2.7 kilograms per hour per centimeter (about 5 to about 30 lbs per hour per inch) of die circumference. The films produced as described herein have characteristics which allow them to be processed successfully at these high speeds. In one embodiment, the use of high-MIR mPE as sublayers results in a higher achievable throughput rates than comparable films without the high-MIR mPE sublayers.

Mechanical strength of the film is different in two film directions, along the film roll (machine direction, MD) and in the perpendicular direction (transverse direction, TD). Typically, the TD strength in such films is significantly higher than their MD strength. The films described herein have a favorable balance of the MD and TD strengths.

Figure 2:
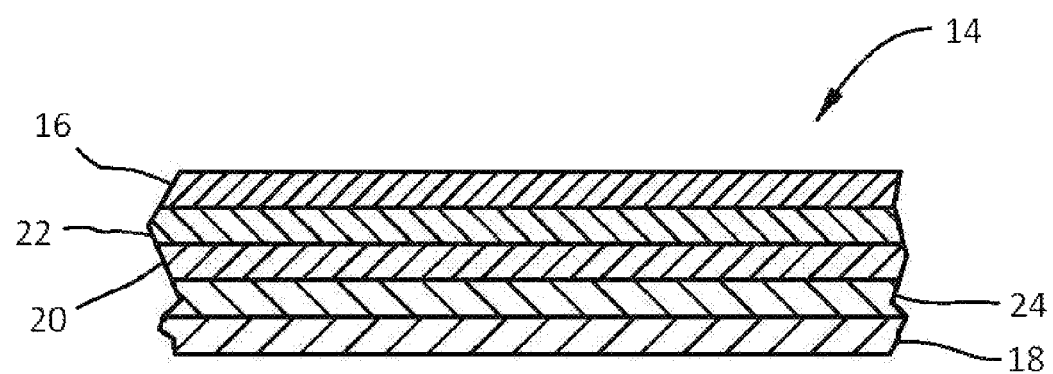
FIG. 2 is a schematic cross section of a blown film laminate according to an embodiment.

FIG. 2 shows a schematic cross section of the laminate 14 produced from the extruder line of FIG. 1, according to an embodiment. According to the embodiment illustrated, the laminate 14 comprises the skin layers 16, 18, the core sublayer 20 and intermediate sublayers 22, 24 sandwiching the core sublayer 20. The laminate 14 is merely illustrative, and in various embodiments can include only four layers or more than five layers, e.g., 6, 7, 8, or 9 layers and so on, limited only by the extrusion equipment and the properties of the respective layers.

Polymers

LDPE maybe prepared in high pressure polymerization using free radical initiators, and typically has a density in the range of 0.915-0.935 g/cm$^3$. LDPE is also known as "branched" or "heterogeneously branched" polyethylene because of the relatively large number of long chain branches extending from the main polymer backbone.

Polyethylene in similar density range, i.e., 0.910 to 0.945 g/cm$^3$, which is linear and does not contain long chain branching is known as "linear low density polyethylene" (LLDPE), and can be produced with conventional Ziegler-Natta catalysts, vanadium catalysts, or with metallocene catalysts in gas phase reactors and/or with metallocene catalysts in slurry reactors and/or with any of the disclosed catalysts in solution reactors. The LLDPE reaction systems are relatively low pressure reactor systems. LLDPE known in the art and not prepared with a single-site catalyst, i.e., non-metallocene LLDPE, is referred to herein as "traditional LLDPE."

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal (M). A metallocene catalyst is considered a single site catalyst. Metallocene catalysts generally require activation with a suitable co-catalyst, or activator, in order to yield an active metallocene catalyst, i.e., an organometallic complex with a vacant coordination site that can coordinate, insert, and polymerize olefins. Active catalyst systems generally include not only the metallocene complex, but also an activator, such as an alumoxane or a derivative thereof such as alkylalumoxane, an ionizing activator, a Lewis acid, or a combination thereof. Methyl alumoxane and modified methylalumoxanes are particularly suitable as catalyst activators. The catalyst system may be supported on a carrier, typically an inorganic oxide or chloride or a resinous material such as, for example, polyethylene, or silica.

Useful metallocene compounds include bridged and unbridged biscyclopentadienyl zirconium compounds, particular where the Cp rings are indenyl or fluorenyl groups. Non-limiting examples of metallocene catalysts and catalyst systems include those described in, inter alia, WO 96/11961 and WO 96/11960, and in U.S. Pat. Nos. 4,808,561; 5,017,714; 5,055,438; 5,064,802; 5,124,418; 5,153,157; and 5,324,800. More recent examples include the catalysts and systems described in U.S. Pat. Nos. 6,380,122 and 6,376,410; WO 01/98409, and in the references cited therein, all of which are fully incorporated herein by reference. As to the process conditions, the overall conditions described in U.S. Pat. No. 5,763,543, incorporated herein by reference, can be adopted.

If any of the resins described herein is produced using a single-site catalyst, it may be (but is not necessarily) identified by the use of an initial lower case "m," e.g., mPE encompasses any metallocene-catalyzed LLDPE. As used herein, the term "metallocene catalyzed polymer" refers to any polymer, copolymer, or terpolymer, and, in particular, any polyolefin polymerized using a single-site catalyst and is used interchangeably with the term "single-site catalyzed polymer," wherein both "metallocene catalyzed polymer" and "single-site catalyzed polymer" are meant to include non-metallocene catalyzed single-site catalyzed polymers. As used herein, the term "Ziegler-Natta catalyzed polymer" refers to any polymer, copolymer, or terpolymer, and, in particular, any polyolefin polymerized using a Ziegler-Natta catalyst.

Metallocene polyethylene (mPE) is thus an LLDPE homopolymer or, preferably, copolymer prepared using a single-site catalyst and has a density of from about 0.910 to about 0.945 g/cm$^3$ and a melt index (MI), $I_{2.16}$, from about 0.1 to about 15 g/10 min. As used herein, mPE having an MI ratio (MIR), $I_{21.6}/I_{2.16}$, greater than 25 up to about 80, preferably from about 28 to about 80 is referred to as a "high-MIR mPE," whereas "low-MIR mPE" has an MIR from about 15 up to 25, preferably from about 15 to about 20, most commonly from 16 to 18. In an embodiment, the low-MIR mPE has a density of from about 0.910 to about 0.930 g/cm$^3$. In one embodiment, the high-MIR mPEs exhibit a melt index ratio according to the following formula (A):

$$\ln(MIR) = -18.20 - 0.2634 \ln(MI, 12.16) + 23.58 * [\text{density, g/cm}^3] \quad (A)$$

High-MIR mPEs can be prepared using the conditions of published application US 20072260016, incorporated herein by reference in its entirety. Briefly, to obtain a desired MIR, both the molar ratio of ethylene and comonomer and the concentration of the comonomer may be varied. Control of the temperature can help control the MI. Overall monomer partial pressures may be used which correspond to conventional practice for gas phase polymerization of LLDPE.

In preferred embodiments, the mPE is a copolymer of ethylene and at least one other α-olefin, such as $C_3$-$C_{20}$ α-olefins, preferably $C_3$-$C_{10}$ α-olefins, and more preferably $C_3$-$C_8$ α-olefins, which may be linear or branched or a combination of two or more α-olefins.

Metallocene polyethylenes may be obtained via a continuous gas phase polymerization or slurry polymerization using supported catalyst comprising an activated molecularly discrete metallocene catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like). Representative mPEs produced using these catalysts generally each have a melt index of from 0.1 or 0.15 to 15, preferably 0.3 to 10 g/10 min, a CDBI of at least 70%, a density of from 0.910 to 0.945 g/cm$^3$, or from 0.910 or 0.915 to 0.930 g/cm$^3$, a haze value of less than 20%, a melt index ratio (MIR), $I_{21.6}/I_{2.16}$, of from 15 to 80, preferably 15-20, 28-80 or a combination thereof, an averaged 1% secant modulus (M) of from about 70 to about 415 MPa (about 10,000 to 60,000 psi), and for the high-MIR mPEs a relation between M and the dart drop impact strength in g/mil (DIS) complying with formula (B):

$$DIS \geq 31.5 * [100 + e^{(11.71 - 0.000268 M + 2.183 * 10^{-9} M^2)}], \quad (B)$$

where "e" represents 2.7183, the base Napierian logarithm, M is the averaged modulus in psi, and DIS is the 66 cm (26-inch) dart impact strength in g/mm.

As used herein, molecular weight distribution (MWD) of a polymer is equivalent to the expression Mw/Mn, and is sometimes also referred to in the art as the polydispersity index (PDI). The expression Mw/Mn is the ratio of the weight average molecular weight (Mw) to the number average molecular weight (Mn). Measurements of Mn, Mw and the z-average molecular weight (Mz) are typically determined by gel permeation chromatography as disclosed in Macromolecules, Vol. 34, No. 19, p. 6812 (2001).

Composition distribution breadth index (CDBI) is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is temperature rising elution fraction (TREF), as described in Wild, et al., J. Poly. Sci., Poly. Phys. Ed., Vol. 20, p. 441 (1982) and U.S. Pat. No. 5,008,204, which are hereby incorporated herein by reference in their entirety.

The mPEs generally have a high stiffness and high impact strength, and the high-MIR mPEs also have good shear thinning and therefore relatively favorable extrusion and other melt processing properties. In comparison to LDPE made in a high pressure process and having a comparable density and MI, the high-MIR mPEs have a favorable DIS-modulus balance, e.g., a DIS that is consistent with that predicted by formula (B) above. In comparison with low-MIR mPE and traditional LLDPE, the high-MIR mPEs have improved shear thinning, a higher CDBI and a higher DIS. Further, high-MIR mPEs exhibit superior puncture force when compared to traditional LLDPEs.

A representative commercial example of a low-MIR mPE is EXCEED™ polymer (made by ExxonMobil Chemical Company) produced in a gas phase process using metallocene-based supported catalysts. An example of a high-MIR mPE includes ENABLE™ polymer (made by ExxonMobil Chemical Company) produced in a gas phase process using metallocene-based supported catalysts. As between the high-MIR and low-MIR mPEs, the high-MIR mPEs have a better shear thinning behavior and comparable other properties.

Very low density polyethylene (VLDPE) is generally similar to LLDPE in terms of composition, MWD, CDBI, etc., and can be produced by a number of different processes yielding polymers with different properties, but are generally described as polyethylenes having a density typically from 0.890 or 0.900 g/cm$^3$ to less than 0.910 or 0.915 g/cm$^3$.

Relatively higher density linear polyethylene, typically in the range of above 0.930 to 0.945 g/cm$^3$, while often considered to be within the scope of low density polyethylene, is also sometimes referred to as "medium density polyethylene" (MDPE). MDPE can be made in any of the above processes with each of the disclosed catalyst systems and, additionally, chrome catalyst systems.

Polyethylene having a still greater density is referred to as "high density polyethylene" (HDPE), i.e., polyethylene having a density greater than 0.945 g/cm$^3$. HDPE is typically prepared with either Ziegler-Natta or chromium-based catalysts in slurry reactors, gas phase reactors, or solution reactors. "Medium-high molecular weight HDPE" is hereinafter defined as HDPE having an MI ranging from about 0.1 g/10 min to about 1.0 g/10 min.

A further class of polyethylene polymers is "differentiated polyethylene" (DPE). Differentiated polyethylenes are defined herein as those polyethylene polymers that comprise polar comonomers or termonomers. Polymers having more than two types of monomers, such as terpolymers, are also included within the term "copolymer" as used herein. Typical DPEs are well known in the art and include, but are not limited to, ethylene polymers comprising ethylene n-butyl acrylate, ethylene methyl acrylate acrylic acid terpolymers, ethylene acrylic acid, ethylene methyl acrylate, zinc or sodium neutralized ethylene acrylic acid copolymers, ethylene vinyl acetate, and combinations of the foregoing.

Polypropylene based polymers (PP) are any polymers comprising at least 50 percent by weight of interpolymerized propylene, such as propylene ethylene copolymers, oriented polypropylene, amorphous polypropylene, or the like. VISTAMAXX™ propylene based elastomers available from ExxonMobil Chemical Company is a representative example of a polypropylene-based polymer.

Nothing with regard to these definitions is intended to be contrary to the generic definitions of these resins that are well known in the art. It should be noted, however, that mPE may refer to a blend of more than one mPE grade/type. Similarly, LLDPE may refer to a blend of more than one LLDPE grade/type, HDPE may refer to a blend of more than one HDPE grade/type, LDPE may refer to a blend of more than one LDPE grade/type, etc. Generally preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the EXACT™, EXCEED™, ESCORENE™, EXXCO™, ESCOR™, ENABLE™, NTX™, PAXON™, and OPTEMA™ trade names.

In some embodiments, compositions described herein include a blend of an LDPE polymer and an HDPE polymer. The blend can further include any mPE described herein, preferably, a metallocene-catalyzed LLDPE polymer, and, more preferably, a gas-phase produced metallocene-catalyzed LLDPE polymer. The blends can include any of the HDPE polymers described herein, preferably, a metallocene-catalyzed HDPE polymer, including those produced in gas phase, slurry, and/or solution processes. The blends include at least 0.1 wt % and up to 99.9 wt % of the LLDPE polymer, and at least 0.1 wt % and up to 99.9 wt % of the HDPE polymer, with these wt % based on the total weight of the LLDPE and HDPE polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the mPE polymer. The balance of the weight percentage is the weight of the HDPE/LDPE polymer component(s).

In some embodiments, compositions described herein include a blend of a high-MIR mPE and a low-MIR mPE, which are preferably, mLLDPE polymers, and, more preferably, gas-phase produced mLLDPE polymer. The blend can further include any HDPE and/or any LDPE described herein, preferably, a metallocene-catalyzed HDPE polymer, including those produced in gas phase, slurry, and/or solution processes. The blends include at least 0.1 wt % and up to 99.9 wt % of the high-MIR mPE polymer, and at least 0.1 wt % and up to 99.9 wt % of the low-MIR mPE polymer, with these wt % based on the total weight of the high-MIR mPE and low-MIR mPE polymers of the blend. Alternative lower limits of the high-MIR mPE and/or low-MIR mPE polymers can be 5%, 10%, 20%, 30% or 40% by weight. Alternative upper limits of the high-MIR mPE and/or low-MIR mPE polymers can be 95%, 90%, 80%, 70%, and 60% by weight. Ranges from any lower limit to any upper limit are within the scope of the invention. Preferred blends include from 5-85%, alternatively from 10-50% or from 10-30% by weight of the HDPE/LDPE polymer component(s). The balance of the weight percentage is the weight of the high-MIR mPE and/or low-MIR mPE polymer.

In any of these embodiments, the LDPE polymer, the HDPE polymer, the high-MIR mPE polymer, the low-MIR mPE polymer, or any two three or all four, can be a single grade of the polymer or blends of such polymers themselves. For example, the LDPE polymer component in a particular layer of the film can itself be a blend of two or more LDPE polymers having the characteristics described herein; alternatively or additionally, the HDPE polymer component of in a particular layer of the film can itself be a blend of two or more HDPE polymers having the characteristics described herein; alternatively or additionally, the high-MIR mPE polymer component in a particular layer of the film can itself be a blend of two or more high-MIR mPE polymers having the characteristics described herein; and alternatively or additionally, the low-MIR mPE polymer component in a particular layer of the film can itself be a blend of two or more low-MIR mPE polymers having the characteristics described herein.

In some embodiments, the film layers described herein can optionally comprise an MDPE polymer, e.g., as a separate layer or blended in the composition of the LDPE, HDPE and/or mPE layers. The MDPE is preferably an mMDPE, including those produced in gas phase, slurry, and/or solution processes. When present as a blend, the blends include at least 0.1 wt % and up to 99.9 wt % of the MDPE polymer, by weight of the polymers in the layer. Alternative lower limits of the MDPE polymer can be 5%, 10%, 20%, 30% or 40% by weight. Alternative upper limits of the MDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the MDPE polymer. The balance of the weight percentage is the weight of the LDPE, HDPE and/or mPE polymer components in the layer.

In some embodiments, the film layers described herein can optionally comprise a VLDPE polymer, e.g., as a separate layer or blended in the composition of the LDPE, HDPE and/or mPE layers. The VLDPE is preferably an mVLDPE, including those produced in gas phase, slurry, and/or solution processes. When present as a blend, the blends include at least 0.1 weight percent and up to 99.9 weight percent of the VLDPE polymer, by weight of the polymers in the layer. Alternative lower limits of the VLDPE polymer can be 5%, 10%, 20%, 30%, or 40% by weight. Alternative upper limits of the VLDPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the VLDPE polymer. The balance of the weight percentage is the weight of the LDPE, HDPE and/or mPE polymer components in the layer.

In some embodiments, the film layers described herein can optionally comprise a DPE polymer, e.g., as a separate layer or blended in the composition of the LDPE, HDPE and/or mPE layers. Exemplary DPEs suitable for use in the blends of the present invention include, but are not limited to, ethylene n-butyl acrylate, ethylene methyl acrylate acid terpolymers, ethylene acrylic acid, ethyl methyl acrylate, zinc or sodium neutralized ethylene acid copolymers, ethylene vinyl acetate, and combinations of the foregoing. When present as a blend, the blends include at least 0.1 weight percent and up to 99.9 weight percent of the DPE polymer, by weight of the polymers in the layer. Alternative lower limits of the DPE polymer can be 5%, 10%, 20%, 30% or 40% by weight. Alternative upper limits of the DPE polymer can be 95%, 90%, 80%, 70%, and 60% by weight. Ranges from any lower limit to any upper limit are within the scope of the invention. Preferred blends include from 5-85%, alternatively from 10-50% or from 10-30% by weight of the DPE polymer. The balance of the weight percentage is the weight of the LDPE, HDPE and/or mPE polymer components in the layer.

When a blend is employed in a layer of the multilayer film, the blend(s) may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc and the like.

In one embodiment, one or both of the skin layers comprise a tackifier such as polybutenes, terpene resins, aliphatic and aromatic hydrocarbon resins, alkali metal and glycerol stearates and hydrogenated rosins. The presence of a tackifier can enhance adhesion, e.g., where the film is used in a cling wrap application.

Multilayer Blown Films

In an embodiment, the multilayer films comprising mPE skin layers, at least one mPE sublayer and at least one HDPE/LDPE sublayer, may be formed by methods and processing equipment that are generally well known in the art. The total thickness of multilayer films may vary based upon the application desired. A total film thickness of about 5-100 µm, more typically about 10-50 µm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly in a blown film process to yield a film with four or more layers adhered together but differing in composition. Exemplary multilayer films have at least four or at least five layers. In one embodiment the multilayer films are composed of five layers.

When used in multilayer films, the mPE or blend comprising the mPE blends may be used in the skin layers and at least one sublayer of the film, or in more than one sublayer of the film, and the HDPE/LDPE polymer or blend is used in at least one sublayer. Each such mPE and/or HDPE/LDPE layer or sublayer can be individually formulated; i.e., the layers formed of a polymer blend can be the same or different chemical composition, density, melt index, thickness, etc., depending upon the desired properties of the film.

To facilitate discussion of different film structures, the following notation is used herein. Each layer of a film is denoted A, A1, A2, B or C, where A indicates an mPE film layer, A1 a low-MIR mPE film layer, A2 a high-MIR mPE film layer, B an LDPE film layer and C an HDPE film layer. Where a film includes more than one A layer or more than one B layer, one or more prime symbols (', ", ''', etc.) are appended to the A or B symbol to indicate layers of the same type that can be the same or can differ in one or more properties, such as chemical composition, density, melt index, thickness, etc. Blends of the materials are indicated by using a plurality of the polymer designations, e.g., AB indicates a blend of mPE and LDPE, A1C designates a blend of high-MIR mPE and LDPE, etc. Finally, the symbols for adjacent layers are separated by a slash (/). Using this notation, a five-layer film having a core sublayer of an LDPE polymer, skin layers of a low-MIR mPE polymer blend with LDPE polymer, and intermediate sublayers of high-MIR mPE would be denoted A2B/A1/B'/A1/A2B. Similarly, a five-layer film of alternating mPE and LDPE layers would be denoted A/B/A'/B'/A''. Unless otherwise indicated, the left-to-right or right-to-left order of layers does not matter, nor does the order of prime symbols; e.g., an A/AB/C/A film is equivalent to an A/C/AB/A film, and an A/A'/B/A'' film is equivalent to an A/B/A'/A'' film, for purposes described herein. The relative thickness of each film layer is similarly denoted, with the thickness of each layer relative to a total film thickness of 100 (dimensionless) indicated numerically and separated by slashes; e.g., the relative thickness of an A/B/A'/A film having A and A' layers of 10 µm each and a B layer of 30 µm is denoted as 20/50/20/20.

Exemplary conventional films are described, for example, in U.S. Pat. Nos. 6,423,420; 6,255,426; 6,265,055; 6,093,480; 6,083,611; 5,922,441; 5,907,943; 5,907,942; 5,902,684; 5,814,399; 5,752,362; 5,749,202; RE 38,658; RE 38,429; WO 2005/065945; each of which is incorporated by reference in its entirety.

For the various films described herein, the A layer in one embodiment can be formed of any mPE material and optionally a blend polyethylene known in the art for use in blown films. Thus, for example, the A layer can be formed of an mLLDPE blend with another polyethylene such as, for example, a VLDPE, an LDPE, an MDPE, an HDPE, or a DPE, as well as other polyethylenes known in the art. Further, the A layer can be a blend of two or more such mPE polymers and/or two or more such other polyethylenes, and can include additives known in the art. In one embodiment, the A layer contains less than 1 percent of additives by weight of the A layer, i.e., the A layer is essentially free of additives. Further, one skilled in the art will understand that the layers of a multilayer film must have the appropriate viscosity match.

Similarly, the B layer can be any one LDPE or a blend of LDPE and another blend polyethylene known in the art for use in blown films. Thus, for example, the B layer can be formed of an LDPE blend with another polyethylene such as, for example, a VLDPE, an MDPE, an HDPE, or a DPE, as well as other polyethylenes known in the art. Further, the B layer can be a blend of two or more such LDPE polymers and/or two or more such other polyethylenes, and can include additives known in the art. In one embodiment, the B layer contains less than 1 percent of additives by weight of the B layer, i.e., the B layer is essentially free of additives.

Similarly, the C layer can be any one HDPE or a blend of HDPE and another blend polyethylene known in the art for use in blown films. Thus, for example, the C layer can be formed of an HDPE blend with another polyethylene such as, for example, a VLDPE, an LDPE, an MDPE, or a DPE, as well as other polyethylenes known in the art. Further, the C layer can be a blend of two or more such HDPE polymers and/or two or more such other polyethylenes, and can include additives known in the art. In one embodiment, the C layer contains less than 1 percent of additives by weight of the C layer, i.e., the C layer is essentially free of additives.

In multilayer structures, one or more A, B or C sublayers can also function as an adhesion-promoting tie layer, or an additional layer in addition to the A, B and/or C sublayers, by including a DPE such as PRIMACOR™ ethylene-acrylic acid copolymers available from. The Dow Chemical Co., and/or ethylene-vinyl acetate copolymers. Other materials for tie layers can be any material that can be coextruded in or with a blown film line, for example, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and the like.

The thickness of each layer of the film, and of the overall film, is not particularly limited, but is determined according to the desired properties of the film. Typical film layers have a thickness of from about 1 to about 1000 µm, more typically from about 5 to about 100 µm, and typical films have an overall thickness of from about 10 to about 100 µm.

In other embodiments, and using the nomenclature described above, the present invention provides multilayer films with any of the following exemplary structures: (a) four-layer films, such as A1/A'/B/A1, A1/A'/A"B/A1, A1/A'/C/A1, A1/A'/A"C/A1, A2/A'/B/A2, A2/A'/A"B/A2, A2/A'/C/A2, A2/A'/A"C/A2, A1/A'/BC/A1, A2/A'/BC/A2, A1A2/A'/B/A1A2, A1A2/A'/A"C/A1A2, AB/A'B'/B"/AB, A/B/A'/AB', A/AC/B'/A', A1A2/C/A'/A1A2, A/AC/B'/AB" and A2C/A/B'/A2C' and the like; (b) five-layer films, such a A1/B/A2/B/A1, A1/C/A2/C/A1, A2/B/A2'/B/A2, A2/C/A2'/C/A2, A1/B/A1'/B/A1, A1/C/A1'/C/A1, A2/B/A1/B/A2, A2/C/A1/C/A2, A1A2/B/A1'/B/A1A2, A1A2/C/A1'/C/A1A2, A2B/A1/B'/A1/A2B, A2B/A1/B'C/A1/A2B, A2C/A1/BC'/A1/A2C and the like; and similar structures for films having six, seven, eight, nine, twenty-four, forty-eight, sixty-four, one hundred, or any other number of layers. It should be appreciated that films having still more layers can be formed using the mPE skins, mPE sublayers and HDPE/LDPE sublayers, and such films are within the scope of the invention.

The multilayer blown films in one embodiment take the form of stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can include conventional additives, such as cling-enhancing additives such as tackifiers, and non-cling or slip additives, to tailor the slip/cling properties of the film.

It is desirable to maximize the degree to which a stretch film is stretched, as expressed by the percent of elongation of the stretched film relative to the unstretched film, and termed the "stretch ratio." At relatively larger stretch ratios, stretch films impart greater holding force. Further, films which can be used at larger stretch ratios with adequate holding force and film strength offer economic advantages, since less film is required for packaging or bundling.

As stretch film is stretched, a small decrease in the film thickness due to small fluctuations in thickness uniformity can result in a large fluctuation in elongation, giving rise to bands of weaker and more elongated film transverse to the direction of stretching, a defect known as "tiger striping". Thus, it is desirable to have a yield plateau slope large enough to avoid tiger striping over typical thickness variations of, for example, +−5%. For robust operation over a wide range of elongation, and using a wide variety of stretching apparatus, it is desirable to have a broad yield plateau region. In addition, since the extent of elongation correlates inversely with the amount of film that must be used to bundle an article, it is desirable for the film to be stretchable to a large elongation. While in principle the elongation at break is the maximum possible elongation, in practice, the natural draw ratio is a better measure of maximum elongation. Thus, it is desirable to have a large natural draw ratio. Other desirable properties, not illustrated in a stress-elongation curve, include high cling force and good puncture resistance.

The above-described multilayer blown films are particularly suitable for stretch film applications. In embodiments, films of the invention can exhibit improved properties, such as applicability over a wide range of stretch ratios without suffering from local deformation leading to break, hole formation, tiger striping, or other defects. Stretch films can be provided so that an end user stretches the film upon application to provide a holding force, or can be provided in a pre-stretched condition. Such pre-stretched films, also included within the term "stretch film", are stretched and rolled after extrusion and cooling, and are provided to the end user in a pre-stretched condition, so that the film upon application provides a holding force by applying tension without the need for the end user to further stretch the film.

Additives can be provided in the various film layers, as is well-known in the art. For stretch film applications, an additive such as a tackifier can be used in one or more layers, preferably the skin layers, to provide a cling force. Suitable tackifiers and other additives are well-known. Suitable tackifiers include any known tackifier effective in providing cling force such as, for example, polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids, such as glycerol monostearate, glycerol monooleate, sorbitan monolaurate, sorbitan monopalmitate, sorbitan monostearate and sorbitan monooleate. The tackifier, if used, can be used in any concentration which will impact the desired cling force, typically from 0.1 to 20% tackifier by weight of the layer and more typically from 0.25 to 6.0% tackifier by weight of the layer. The tackifier can be added to both outer skin layers to provide a stretch film having two-sided cling, or in only one outer layer, to provide a stretch film having one-sided cling.

Some multilayer films described herein may also be suited for use in stretch handwrap films. Stretch film handwrap requires a combination of excellent film toughness, especially puncture, MD tear performance, dart drop performance, and a very stiff, i.e., difficult to stretch, film. Film 'stiffness' minimizes the stretch required to provide adequate load holding force to a wrapped load and to prevent further stretching of the film. The film toughness is required because handwrap loads (being wrapped) are typically more irregular and frequently contain greater puncture requirements than typical machine stretch loads. In some embodiments, stretch handwrap films exhibit a Highlight ultimate stretch force greater than or equal to about 334 N (75 pounds), preferably greater than or equal to 378 N, 445 N, or 556 N (85, 100, or 125 pounds). Further, in some embodiments, the stretch handwrap films exhibit a puncture peak force greater than or equal to about 40 N (9 pounds), preferably greater than or equal to about 45 or 50 N (10 or 11 pounds). In some embodiments, the films are downgauged stretch handwrap films.

Films described herein show improved performance and mechanical properties when compared to films previously known in the art. For example, films containing the mPE skin layers and sublayers and at least one HDPE/LDPE sublayer have improved shrink properties, better clarity, good seal strength and hot tack performance, increased toughness, and lower coefficient of friction. In addition, such films may also exhibit higher ultimate stretch and typically have better processability when compared with other LLDPE resins and blends.

In an embodiment, the multilayer films are made into bags. Bags include those bag structures and bag applications known to those skilled in the art. Exemplary bags include shipping sacks, trash bags and liners, industrial liners, produce bags, and heavy duty bags. Heavy duty bags are prepared by techniques known to those skilled in the art, such as for example, vertical form fill and seal equipment. Exemplary conventional heavy duty bags and the apparatus utilized to prepare them are disclosed in U.S. Patent Application Publication 2006/0188678 and U.S. Pat. Nos. 4,571,926; 4,532,753; 4,532,752; 4,589,247; 4,506,494; and 4,103,473, each of which is herein incorporated by reference in its entirety.

In one embodiment, the films are utilized in packaging applications. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers and various like goods normally containerized and/or palletized for shipping, storage, and/or display.

Accordingly, the invention provides the following embodiments:

A. A multilayer blown film, comprising: (1) a first layer comprising a first metallocene polyethylene (mPE) comprising a copolymer derived from ethylene and one or more $C_3$ to $C_{20}$ α-olefin comonomers, wherein the copolymer has a density from about 0.910 to about 0.930 g/cm$^3$, a melt index (MI), $I_{2.16}$, from about 0.1 to about 15, a molecular weight distribution (MWD) from about 2.5 to about 5.5, and melt index ratio (MIR), $I_{2.16}/I_{2.16}$, from 15 to 25 (low-MIR mPE); (2) a second layer comprising a second mPE comprising a copolymer derived from ethylene and one or more $C_3$ to $C_{20}$ α-olefin comonomers, wherein the copolymer has density from about 0.910 to about 0.945 g/cm$^3$, MI from about 0.1 to about 15, MWD from about 2.5 to about 5.5, and MIR from greater than 25 to 80 (high-MIR mPE), provided that where the first and second layers both comprise low-MIR and high-MIR mPE, a blend ratio of the low-MIR to high-MIR mPE in the first layer is different from a blend ratio of the low-MIR to high-MIR mPE in the second layer; and (3) a third layer comprising high density polyethylene (HDPE), low density polyethylene (LDPE) or a combination thereof, provided that where the third layer further comprises mPE and where one or both of the first and second layers further comprise HDPE, LDPE or a combination thereof, a proportion of the HDPE, LDPE or combination thereof in the third layer by weight of the total polymer in the third layer is different from the proportions of HDPE, LDPE or combination thereof in the first and second layers.

B. A multilayer blown film, comprising: (1) skin layers each comprising a metallocene polyethylene (mPE) comprising a copolymer derived from ethylene and one or more $C_3$ to $C_{20}$ α-olefin comonomers, wherein the copolymer has a density from about 0.910 to about 0.945 g/cm$^3$, a melt index (MI), $I_{2.16}$, from about 0.1 to about 15, a molecular weight distribution (MWD) from about 2.5 to about 5.5, and melt index ratio (MIR), $I_{2.16}/I_{2.16}$, from about 15 to 25 (low-MIR mPE) or from greater than 25 up to about 80 (high-MIR mPE); (2) at least one sublayer comprising mPE; and (3) at least one sublayer comprising high density polyethylene (HDPE), low density polyethylene (LDPE) or a combination thereof.

C. The multilayer blown film of embodiment B, wherein the skin layers independently comprise low-MIR mPE, high-MIR mPE, or a combination thereof.

D. The multilayer blown film of embodiment B or embodiment C, wherein the sublayer mPE comprises low-MIR mPE, high-MIR mPE, or a combination thereof.

E. The multilayer blown film of any one of embodiments B to D, wherein the at least one mPE sublayer comprises at least one pair of intermediate layers on opposite sides of a core sublayer comprising the at least one sublayer comprising the HDPE, LDPE or combination thereof.

F. The multilayer blown film of any one of embodiments B to D, wherein the at least one sublayer comprising the HDPE, LDPE or combination thereof comprises at least one pair of intermediate layers on opposite sides of a core sublayer comprising the at least one mPE sublayer.

G. The multilayer blown film of embodiment E or embodiment F, wherein the intermediate sublayers are from about 1 to about 2 times as thick as one of the skin layers and wherein the core sublayer is from about 1 to about 6 times as thick as one of the intermediate layers.

H. The multilayer blown film of embodiment B, wherein: (1) the skin layers independently comprise the low-MIR mPE; (2) the sublayer mPE comprises high-MIR mPE; (3) the at least one mPE sublayer comprises a pair of intermediate layers on opposite sides of a core sublayer comprising the at least one sublayer comprising HDPE, LDPE or a combination thereof; and (4) the core sublayer comprises LDPE.

I. The multilayer blown film of embodiment H, wherein the skin layers further comprise up to 95 percent by weight of another polymer selected from the group consisting of: LDPE, DPE and combinations thereof.

J. The multilayer blown film of any one of embodiments E to I, wherein the multilayer film comprises, relative to a 3-layer reference film, (A) about the same or higher MD tensile at break, MD 1% secant modulus and puncture resistance (maximum force), and (B) substantially higher MD elongation at break, TD tensile at break and MD Elmendorf tear strength, wherein the reference film comprises a core layer having the same composition and thickness as the multilayer film core, and skin layers having the same composition as the multilayer film skin layers and the same thickness as the combined thickness of one of the multilayer film skin layers and one of the intermediate layers.

K. The multilayer blown film of embodiment B, wherein: (1) the skin layers independently comprise the low-MIR mPE; (2) the sublayer mPE comprises high-MIR mPE; (3) the at least one mPE sublayer comprises a pair of intermediate layers on opposite sides of a core sublayer comprising the at least one sublayer comprising HDPE, LDPE or a combination thereof.

L. The multilayer blown film of embodiment K, wherein the skin layers comprise up to 80 percent by weight of another polymer selected from the group consisting of HDPE, LDPE and combinations thereof, and wherein the core sublayer comprises HDPE and LDPE at a ratio from 1:10 to 10:1 by weight.

M. The multilayer blown film of any one of embodiments E to L, wherein the multilayer film comprises, relative to a 3-layer reference film, (A) about the same or higher MD tensile at break, MD elongation at break and puncture resistance (maximum force), and (B) substantially higher MD Retramat shrink force and MD 1% secant modulus, wherein the reference film comprises a core and skin layers having the same composition as the multilayer film core and skin layers, respectively, wherein the reference film skin layers are twice as thick as the multilayer film skin layers and wherein the reference film core sublayer is the same thickness as the total thickness of the multilayer film core sublayer plus one of the intermediate layers.

N. The multilayer blown film of embodiment B, wherein: (1) the skin layers independently comprise the low-MIR mPE, the high-MIR mPE or a combination thereof; (2) the sublayer mPE comprises the low-MIR mPE, the high-MIR mPE or a combination thereof; (3) the at least one sublayer comprising HDPE, LDPE or a combination thereof comprises a pair of intermediate layers on opposite sides of a core sublayer comprising the mPE sublayer; and (4) the intermediate layers comprise HDPE.

O. The multilayer blown film of embodiment N, wherein the skin layer mPE comprises the high-MIR mPE and wherein the sublayer mPE comprises the low-MIR mPE.

P. The multilayer blown film of embodiment N or embodiment O, wherein the multilayer film comprises, relative to a 3-layer reference film, (A) about the same or higher MD 1% secant modulus and Dart impact strength, and (B) higher MD tensile strength at break, MD bending stiffness, puncture force and creep at 50° C. and 1 kg, wherein the reference film comprises the same skin layer composition as the multilayer film, wherein the reference film core sublayer comprises a 60-40 blend by weight of the HDPE in the intermediate layers and the mPE in the multilayer film core sublayer, and wherein the overall thickness of the reference film is the same as the multilayer film, and wherein the reference film skin layers are one-third the thickness of the reference film core sublayer.

Q. The multilayer blown film of embodiment B, wherein: (1) the skin layers independently comprise the low-MIR mPE and the high-MIR mPE at a ratio from 1:10 to 10:1 by weight; (2) the sublayer mPE comprises the high-MIR mPE; and (3) the at least one pair of intermediate sublayers comprise HDPE.

R. The multilayer blown film of embodiment Q, wherein the intermediate sublayers further comprise up to 90 percent by weight of a propylene-based polymer.

S. The multilayer blown film of embodiment Q or embodiment R, wherein the multilayer film comprises, relative to a 3-layer reference film, (A) about the same or higher MD tensile strength at break and (B) substantially higher TD 1% secant modulus and MD 1% secant modulus, wherein the reference film has skin layers comprising an 85-15 blend by weight of the same low-MIR mPE and the same high-MIR mPE as the multilayer film skin layers, and has a core sublayer of the same high-MIR mPE as the multilayer film core sublayer, wherein each of the skin layers in the reference film are one-half the thickness of the reference film core sublayer, and wherein the overall thickness of the reference film is the same as the multilayer film.

T. A process, comprising: (1) supplying respective melt streams to a multilayer blown film extruder die; (2) coextruding the melt streams to form a blown film comprising inner and outer skin layers and a plurality of sublayers, wherein the skin layers comprise a metallocene polyethylene (mPE) comprising a copolymer derived from ethylene and one or more $C_3$ to $C_{20}$ α-olefin comonomers, wherein the copolymer has a density from about 0.910 to about 0.945 g/cm$^3$, a melt index (MI), $I_{2.16}$, from about 0.1 to about 15, a molecular weight distribution (MWD) from about 2.5 to about 5.5, and melt index ratio (MIR), $I_{2.16}/I_{2.16}$, from about 15 up to 25 (low-MIR mPE) or from greater than 25 up to about 80 (high-MIR mPE), wherein at least one of the sublayers comprises mPE, and wherein at least one of the sublayers comprises high density polyethylene (HDPE), low density polyethylene (LDPE) or a combination thereof; (2) controlling a draw-down ratio from about 1 to about 500 and a blow-up ratio at a bubble from about 1.2 to about 4.5; and (3) cooling the film adjacent the bubble to maintain a freeze-line distance from the die between about 1.5 and about 5 times a diameter of the die.

U. The process of embodiment T, wherein the sublayer mPE comprises low-MIR mPE, high-MIR mPE, or a combination thereof.

V. The process of embodiment T or embodiment U, wherein the at least one mPE sublayer comprises a pair of intermediate sublayers on opposite sides of a core sublayer comprising the at least one sublayer comprising the HDPE, LDPE or combination thereof.

W. The process of claim 21, wherein the skin layers independently comprise the low-MIR mPE; the sublayer mPE comprises high-MIR mPE; the at least one mPE sublayer comprises a pair of intermediate layers on opposite sides of a core sublayer comprising the at least one sublayer comprising HDPE, LDPE or a combination thereof; and the core sublayer comprises LDPE.

X. The process of embodiment V or embodiment W, wherein the intermediate layers are from about 1 to about 2 times as thick as one of the skin layers and wherein the core sublayer is from about 1 to about 6 times as thick as one of the intermediate layers.

Y. The process of embodiment T for making the multilayer blown film of any one of embodiments A to S.

Z. A multilayer blown film made by the process of any one of embodiments T to X.

AA. A collation shrink structure comprising the multilayer blown film of embodiment K or embodiment L.

BB. A heavy duty bag comprising the multilayer blown film of any one of embodiments N to P.

CC. A laminated structure comprising the multilayer blown film of any one of embodiments Q to S.

EXAMPLES

Test Methods

The properties cited below were determined in accordance with the following test procedures. Where any of these properties is referenced in the appended claims, it is to be measured in accordance with the specified test procedure. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in μm, was measured using a Measuretech Series 200 instrument. The instrument measures film thickness using a capacitance gauge. For each film sample, ten film thickness datapoints were measured per inch of film as the film was passed through the gauge in a transverse direction. From these measurements, an average gauge measurement was determined and reported.

Elmendorf Tear, reported in grams (g) or grams per mm (g/mm), was measured as specified by ASTM D-1922.

Tensile Strength at Yield, Tensile Strength at Break, Tensile Strength at 50%, 100%, and/or 200% Elongation, Ultimate Tensile Strength, and 1% Secant Modulus (M), all reported in megapascals (MPa), were measured as specified by ASTM D-882. Tensile Peak Load (kg), Tensile Energy (cm-kg), Elongation at Yield (%), and Elongation at Break (%) were also measured as specified by ASTM D-882.

Haze, reported as a percentage (%), was measured as specified by ASTM D-1003.

Gloss, a dimensionless number, was measured as specified by ASTM D-2457 at 450.

Melt Index (MI), $I_{2.16}$, reported in grams per 10 minutes (g/10 min), refers to the melt flow rate measured according to ASTM D-1238, condition E. High Load Melt Index (HLMI), $I_{2.16}$, reported in grams per 10 minutes (g/10 min), refers to the melt flow rate measured according to ASTM D-1238, condition F. Melt Index Ratio (MIR), a dimensionless number, is the ratio of the HLMI to the MI, or $I_{2.16}/I_{2.16}$.

100% Modulus, reported millipascals (mPa), was measured as specified by ASTM D-412.

300% Modulus, reported in millipascals (mPa), was measured as specified by ASTM D-412.

Density, reported in grams per cubic centimeter (g/cm$^3$), was determined using chips cut from plaques compression molded in accordance with ASTM D-1928 Procedure C, aged in accordance with ASTM D-618 Procedure A, and measured as specified by ASTM D-1505.

Dart F50, or Dart Drop Impact or Dart Drop Impact Strength (DIS), reported in grams (g) and/or grams per micron (g/μm), was measured as specified by ASTM D-1709, method A, unless otherwise specified.

A probe puncture energy test was completed using an Instron Universal tester that records a continuous reading of the force (stress) and penetration (strain) curve. A 15 cm by 15 cm film specimen was securely mounted to a compression load cell to expose a test area 10 cm by 10 cm. Two HDPE slip sheets each 5 cm by 5 cm and each approximately 6.35 μm thick were loosely placed on the test surface. A 1.875 cm diameter elongated matte finished stainless steel probe, traveling at a constant speed of 35 cm/min was lowered into the film, and a stress/strain curve was recorded and plotted. The "puncture force" was the maximum force (N) or kg/mm encountered. The probe penetration distance was not recorded in these tests, unless specifically states to the contrary.

Shrink, reported as a percentage, was measured by cutting circular specimens from a film using a 100 mm die. The samples were marked in their respective directions, dusted with talc, and placed on a pre-heated, talc covered tile. The samples were then heated using a heat gun (model HG-501A) for approximately 10 to 45 seconds, or until the dimensional change ceased. An average of three specimens is reported. A negative shrinkage number indicates expansion of a dimension after heating when compared to its pre-heating dimension.

Coefficient of Friction, reported without units, was measured as specified by ASTM D-1894. Persons having ordinary skill in the art will recognize that, with respect to films, coefficient of friction may be measured in a number of configurations. Accordingly, such measurements will be designated as inside surface-to-inside surface (I/I), outside surface-to-inside surface (O/I), and outside surface-to-outside surface (O/O).

The polymers used in these examples were commercial grades available from ExxonMobil Chemical Company. The polymers and selected properties are listed in Table 1 below:

TABLE A

Commercial Polymers from ExxonMobil Chemical Company

| Trade Designation | Description |
|---|---|
| EXCEED 1018 | Low-MIR mPE, comonomer hexene, density 0.918 g/cm$^3$, MI 1, MIR 16 |
| EXCEED 1018CA | Low-MIR mPE, comonomer hexene, density 0.918 g/cm$^3$, MI 1, MIR 16 |
| EXCEED 1018CA/EB | Low-MIR mPE, comonomer hexene, density 0.918 g/cm$^3$, MI 1, MIR 16 |
| EXCEED 2018EB | Low-MIR mPE, comonomer hexene, density 0.918 g/cm$^3$, MI 2, MIR 16 |
| ENABLE 20-05 | High-MIR mPE, comonomer hexene, density 0.920 g/cm$^3$, MI 0.5, MIR 40 |
| ENABLE 20-05CH | High-MIR mPE, comonomer hexene, density 0.920 g/cm$^3$, MI 0.5, MIR 40 |
| ENABLE 20-10CB | High-MIR mPE, comonomer hexene, density 0.918 g/cm$^3$, MI 1.0, MIR 32 |
| ENABLE 27-05 | High-MIR mPE, comonomer hexene, density 0.927 g/cm$^3$, MWD, MI 0.5, MIR 42 |
| ENABLE 35-05 | High-MIR mPE, comonomer hexene, density 0.935 g/cm$^3$, MI 0.5, MIR 48 |
| ENABLE 35-05CH | High-MIR mPE, comonomer hexene, density 0.935 g/cm$^3$, MI 0.5, MIR 48 |
| LD151HR | LDPE, density 0.933 g/cm$^3$, MI 3.2 |
| LD157CW | LDPE, density 0.931 g/cm$^3$, MI 0.6 |
| LD165BW1 | LDPE, density 0.922 g/cm$^3$, MWD 6.3, MI 0.33 |
| HTA002 | HDPE, density 0.952 g/cm$^3$, MI 0.03 |
| HTA108 | HDPE, density 0.962 g/cm$^3$, MWD 5.9, MI 0.7 |

Example 1

A five-layer film was made according to the present invention with a Windmoller & Hölscher (W&H) VAREX 5-layer line, MAXICONE P 160/400-5-P2K, extruder 70/70/105/70/70.30 D, line width 2200 mm, 400 mm 5-layer die with OPTICOOL dual lip air ring and a FILMATIC S winder. A similar three-layer reference film (made on a >3-layer line simulating a 3-layer line) was tested for comparative properties. The film constructs and results are shown in Table 1.

TABLE 1

Film constructs for increased output

| Blown Film: | RF-1 (3-layer, 1/2/1, 40 μm) | BF-1 (5-layer, 1/1/4/1/1, 40 μm) |
|---|---|---|
| Layer | | |
| Skin 1 | 10 μm 15 wt % EXCEED 2018EB Low-MIR mPE blend with 85 wt % LD151HR LDPE | 5 μm 20 wt % EXCEED 2018EB Low-MIR mPE blend with 80 wt % LD151HR LDPE |
| Sublayer 1 | N/A | 5 μm ENABLE 27-05 high-MIR mPE |
| Core sublayer | 20 μm LD157CW LDPE | 20 μm LD157CW LDPE |
| Sublayer 2 | N/A | 5 μm ENABLE 27-05 high-MIR mPE |

TABLE 1-continued

Film constructs for increased output

| Blown Film: | RF-1 (3-layer, 1/2/1, 40 μm) | BF-1 (5-layer, 1/1/4/1/1, 40 μm) |
|---|---|---|
| Skin 2+ | 10 μm 15 wt % EXCEED 2018EB Low-MIR mPE blend with 85 wt % LD151HR LDPE | 5 μm 20 wt % EXCEED 2018EB Low-MIR mPE blend with 80 wt % LD151HR LDPE |
| Equipment | | |
| Line | N/A | Windmöller & Hölscher 5-Layer |
| Die diameter (D0) | N/A | 400 mm |
| Bubble diameter (Df) | N/A | 2.5 m |
| Rate, kg/h | N/A | 1000 |
| Rate, kg/h-mm die circumference | N/A | 0.80 |
| Property | | |
| Tensile at break MD, MPa | 31 | 32.4 |
| Elongation at break MD, % | 187 | 352 |
| 1% Secant modulus, MPa | 374 | 372 |
| Tensile at break TD, MPa | 23 | 34.7 |
| Puncture resistance maximum, MPa | 1.1 | 1.2 |
| Elmendorf tear strength MD, g/μm | 3.9 | 13.7 |
| Dart impact method A, g/μm | 2.1 | 3.3 |

As seen in Table 1, the output for the 5-layer film was 1000 kg/h compared to a record output of 750 kg/h for a three-layer film made on a 3-layer line and having properties similar to the reference film RF-1, while the film properties for BF-1, including toughness, were improved.

Example 2

Packaging application. A typical three-layer laminating film for packaging was optimized on a W&H 3-layer line, model VAREX, using a 250 mm die, 1.6 mm die gap, dual lip air ring with chilled air at around 12° C. producing nominal 45 μm films from the pure resins and selected blends. A similar five-layer film was made according to the present invention with a Hosokawa Alpine 5-layer line producing nominal 40 μm films from the pure resins and selected blends. The film constructs and results are shown in Table 2.

TABLE 2

Film constructs laminating application

| Blown Film: | RF-2 (3-layer, 1/2/1, 40 μm) | BF-2 (5-layer, 1/1/6/1/1, 40 μm) |
|---|---|---|
| Layer | | |
| Skin 1 | 11 μm 85 wt % EXCEED 2018EB Low-MIR mPE blend with 15 wt % ENABLE 20-05CH High-MIR mPE | 4 μm 70 wt % EXCEED 2018EB Low-MIR mPE blend with 30 wt % ENABLE 20-10CB High-MIR mPE |
| Sublayer 1 | N/A | 4 μm HTA108 HDPE |
| Core sublayer | 23 μm ENABLE 35-05CH | 24 μm ENABLE 35-05CH |

TABLE 2-continued

Film constructs laminating application

| Blown Film: | RF-2 (3-layer, 1/2/1, 40 μm) | BF-2 (5-layer, 1/1/6/1/1, 40 μm) |
|---|---|---|
| Sublayer 2 | N/A | 4 μm HTA108 HDPE |
| Skin 2 | 11 μm 85 wt % EXCEED 2018EB Low-MIR mPE blend with 15 wt % ENABLE 35-05CH High-MIR mPE | 4 μm 70 wt % EXCEED 2018EB Low-MIR mPE blend with 30 wt % ENABLE 20-10CB High-MIR mPE |
| Equipment | | |
| Line | W&H 3-Layer | Hosokawa Alpine 5-Layer |
| Property | | |
| Tensile at break MD, MPa | 46 | 54.1 |
| 1% Secant Modulus TD, MPa | 305 | 517 |
| 1% Secant Modulus TD, MPa | 331 | 543 |
| Puncture Force, N/μm | 2.7 | 2.3 |
| Elmendorf tear MD, g/μm | 4.7 | 2.1 |
| Dart impact - Method A, g/μm | 5.7 | 4.5 |

As seen from Table 2, the 5-layer film demonstrates a 65-70% increase in stiffness through the introduction of an HDPE sandwich layer on either side of the high-MIR mPE core sublayer as compared to the leading 3-layer lamination structure, in spite of a thickness reduction from 45 to 40 μm. There was a more modest reduction of less critical lamination parameters.

Example 3

Heavy duty bags. A typical three-layer HDS film structure for heavy duty bags was optimized on a W&H VAREX 3-layer line. A similar five-layer film was made according to the present invention on a W&H VAREX 5-layer line. The film constructs and results are shown in Table 3.

TABLE 3

Film constructs for heavy duty bags

| Blown Film: | RF-3 (3-layer, 1/3/1, 100 μm) | BF-3 (5-layer, 1/2/2/2/1, 100 μm) |
|---|---|---|
| Layer | | |
| Skin 1 | 25 μm 95 wt % EXCEED 1018 Low-MIR mPE blend with 5 wt % LD150 | 12.5 μm ENABLE 20-05 high-MIR mPE |
| Sublayer 1 | N/A | 25 μm HTA002 HDPE |
| Core | 50 μm 30 wt % EXCEED 1018 Low-MIR mPE blend with 70 wt % HTA002 HDPE | 25 μm 15 wt % EXCEED 1018CA Low-MIR mPE |
| Sublayer 2 | N/A | 25 μm HTA002 HDPE |
| Skin 2 | 25 μm 95 wt % EXCEED 1018 Low-MIR mPE blend with 5 wt % LD150 | 12.5 μm ENABLE 20-05 high-MIR mPE |

TABLE 3-continued

Film constructs for heavy duty bags

| Blown Film: | RF-3<br>(3-layer, 1/3/1, 100 μm) | BF-3 (5-layer,<br>1/2/2/2/1, 100 μm) |
|---|---|---|
| Equipment | | |
| Line | W&H VAREX | W&H VAREX |
| Property | | |
| Dart impact g/μm | 5.4 | 4.93 |
| Tensile at break MPa MD | 42.3 | 54.1 |
| 1% Secant modulus Mpa MD | 474 | 539 |
| Bending stiffness E mod MPa MD | 215 | 303 |
| Puncture force N/μm | 1.9 | 2.42 |
| Creep % 50° C. 1 Kg | 37 | 24 |

As seen in Table 3, the 5-layer film used a separate HDPE grade in a sandwich around the core to maximize bending stiffness by more than 40 percent relative to a leading 3-layer film. The 5-layer film allowed an overall increase in HDPE content without increasing the film thickness. There was a shift of the toughness-stiffness balance. This example suggests further increases in toughness may be possible by addition of a propylene-based polymer such as VISTAMAXX to the core sublayer.

Example 4

Collation shrink. A typical three-layer collation shrink film structure was optimized on a W&H VAREX 3-layer line. A similar five-layer film was made according to the present invention on a W&H VAREX 5-layer line. The film constructs and results are shown in Table 4.

TABLE 4

Film constructs for collation shrink application

| Blown Film: | RF-1<br>(3-layer, 1/3/1, 40 μm) | BF-1<br>(5-layer, 1/2/4/2/1, 40 μm) |
|---|---|---|
| Layer | | |
| Skin 1 | 8 μm<br>80 wt % EXCEED 2018CA/EB Low-MIR mPE blend with 20 wt % HTA108 HDPE | 4 μm<br>80 wt % EXCEED 2018EB Low-MIR mPE blend with 20 wt % HTA108 HDPE |
| Sublayer 1 | N/A | 8 μm<br>ENABLE 35-05 high-MIR mPE |
| Core | 24 μm<br>60 wt % ENABLE 35-05 high-MIR mPE blend with 20 wt % LD165BW1 LDPE and 20 wt % HTA108 HDPE | 16 μm<br>70 wt % HTA108 HDPE blend with 30 wt % LD165BW1 LDPE |
| Sublayer 2 | N/A | 8 μm<br>ENABLE 35-05 high-MIR mPE |
| Skin 2 | 8 μm<br>80 wt % EXCEED 2018CA/EB Low-MIR mPE blend with 20 wt % HTA108 HDPE | 4 μm<br>80 wt % EXCEED 2018EB Low-MIR mPE blend with 20 wt % HTA108 HDPE |
| Equipment | | |

TABLE 4-continued

Film constructs for collation shrink application

| Blown Film: | RF-1<br>(3-layer, 1/3/1, 40 μm) | BF-1<br>(5-layer, 1/2/4/2/1, 40 μm) |
|---|---|---|
| Line | W&H VAREX | W&H VAREX |
| Property | | |
| Tensile at break MD, MPa | 51.5 | 49.9 |
| Elongation at break MD, % | 628 | 630 |
| 1% Secant modulus, MPa | 453 | 537 |
| Puncture force maximum, MPa | 2.37 | 2.2 |
| Elmendorf tear strength MD, g/μm | 1.9 | 1.4 |
| Retramat MD shrink force | 1.35 | 1.7 |

As seen in Table 4, the 5-layer film used a high-MIR mPE grade in a sandwich around the LDPE/HDPE core to improve the key collation shrink parameters relative to a leading 3-layer film. The 5-layer film demonstrated a step-out 25% increase in MD shrink force together with a 20% stiffness increase. In addition, a thinner sealing layer in the 5-layer film combines excellent sealing characteristics with easy cuttability.

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated herein by reference for all jurisdictions in which such incorporation is permitted.

What is claimed is:

1. A multilayer blown film, comprising:
   one or more skin layers each comprising at least 20 wt % based upon the total weight of the skin layer of a metallocene polyethylene (mPE) comprising a copolymer derived from ethylene and one or more $C_3$ to $C_{20}$ α-olefin comonomers, wherein the copolymer has a density from about 0.910 to about 0.930 g/cm$^3$, a melt index (MI), $I_{2.16}$, from about 0.1 to about 15, a molecular weight distribution (MWD) from about 2.5 to about 5.5, and melt index ratio (MIR), $I_{21.6}/I_{2.16}$, from about 15 to about 20 (low-MIR mPE);
   at least one sublayer comprising mPE; and
   at least one sublayer comprising high density polyethylene (HDPE), low density polyethylene (LDPE) or a combination thereof.

2. The multilayer blown film of claim 1, wherein the skin layers further independently comprise a mPE having an MIR from about 25 to about 80 (high-MIR mPE).

3. The multilayer blown film of claim 1, wherein the sublayer mPE comprises low-MIR mPE, high-MIR mPE, or a combination thereof.

4. The multilayer blown film of claim 1, wherein the at least one mPE sublayer comprises at least one pair of intermediate layers on opposite sides of a core sublayer comprising the at least one sublayer comprising the HDPE, LDPE or combination thereof.

5. The multilayer blown film of claim 4, wherein the intermediate sublayers are from about 1 to about 2 times as thick as one of the skin layers and wherein the core sublayer is from about 1 to about 6 times as thick as one of the intermediate layers.

6. The multilayer blown film of claim 1, wherein the at least one sublayer comprising the HDPE, LDPE or combination thereof comprises at least one pair of intermediate layers on opposite sides of a core sublayer comprising the at least one mPE sublayer.

7. The multilayer blown film of claim 6, wherein the intermediate sublayers are from about 1 to about 2 times as thick as one of the skin layers and wherein the core sublayer is from about 1 to about 6 times as thick as one of the intermediate layers.

8. The multilayer blown film of claim 1, wherein:
the sublayer mPE comprises high-MIR mPE;
the at least one mPE sublayer comprises a pair of intermediate layers on opposite sides of a core sublayer comprising the at least one sublayer comprising HDPE, LDPE or a combination thereof; and
the core sublayer comprises LDPE.

9. The multilayer blown film of claim 8, wherein the skin layers further comprise up to 80 percent by weight of another polymer selected from the group consisting of: LDPE, DPE and combinations thereof.

10. The multilayer blown film of claim 1, wherein:
the sublayer mPE comprises high-MIR mPE; and
the at least one mPE sublayer comprises a pair of intermediate layers on opposite sides of a core sublayer comprising the at least one sublayer comprising HDPE, LDPE or a combination thereof.

11. The multilayer blown film of claim 10, wherein the skin layers comprise up to 80 percent by weight of another polymer selected from the group consisting of HDPE, LDPE and combinations thereof, and wherein the core sublayer comprises HDPE and LDPE at a ratio from 1:10 to 10:1 by weight.

12. The multilayer blown film of claim 1, wherein:
the sublayer mPE comprises the low-MIR mPE, the high-MIR mPE or a combination thereof;
the at least one sublayer comprising HDPE, LDPE or a combination thereof comprises a pair of intermediate layers on opposite sides of a core sublayer comprising the mPE sublayer; and
the intermediate layers comprise HDPE.

13. The multilayer blown film of claim 1, wherein:
the skin layers independently comprise the low-MIR mPE and the high-MIR mPE at a ratio from 1:10 to 10:1 by weight;
the sublayer mPE comprises the high-MIR mPE; and
the at least one pair of intermediate sublayers comprise HDPE.

14. The multilayer blown film of claim 13, wherein the intermediate sublayers further comprise up to 90 percent by weight of a propylene-based polymer.

15. The multilayer blown film of claim 1, wherein the one or more skin layers each comprise at least 70 wt % based upon the total weight of the skin layer of the low-MIR mPE.

16. The multilayer blown film of claim 1, wherein the one or more skin layers each comprise at least 80 wt % based upon the total weight of the skin layer of the low-MIR mPE.

17. The multilayer blown film of claim 1, wherein the at least one sublayer comprising mPE comprises high-MIR mPE.

18. The multilayer blown film of claim 1, wherein the low-MIR mPE has an MIR from about 16 to about 18.

* * * * *